United States Patent [19]
Zajac, Jr. et al.

[11] Patent Number: 4,637,928
[45] Date of Patent: Jan. 20, 1987

[54] METHOD AND APPARATUS FOR NEUTRALIZING REACTIVE MATERIAL SUCH AS BATTERIES

[75] Inventors: William V. Zajac, Jr.; Henry G. Kautz, both of Clarence; David J. Kautz, Williamsville; Arthur J. Bossert, Clarence; Sidney Cohen, Grand Island, all of N.Y.

[73] Assignee: Greatbatch Enterprises, Inc., Clarence, N.Y.

[21] Appl. No.: 406,033

[22] Filed: Aug. 6, 1982

[51] Int. Cl.$^4$ .................. H01M 6/50; H01M 10/42; C01D 15/00; C01G 21/00
[52] U.S. Cl. .................. 423/659; 423/179.5; 429/49; 241/27; 241/46.08
[58] Field of Search .................. 423/89, 92, 98, 179.5, 423/657; 429/49; 241/27, 46.08

[56] References Cited

U.S. PATENT DOCUMENTS

| | | | |
|---|---|---|---|
| 1,570,438 | 1/1926 | Evans | 423/89 |
| 1,587,623 | 6/1926 | Zuckerman | 423/92 |
| 3,004,721 | 10/1961 | Notzold | 241/27 |
| 3,459,493 | 8/1969 | Ross | 423/657 |
| 3,506,550 | 4/1970 | Knapp, Jr. | 429/49 |
| 3,892,563 | 7/1975 | La Point | 423/92 |
| 4,118,219 | 10/1978 | Elmore et al. | 423/92 |
| 4,220,628 | 9/1980 | Striffler, Jr. et al. | 423/92 |
| 4,269,810 | 5/1981 | Kolakowski | 423/92 |
| 4,384,683 | 5/1983 | Huwald et al. | 241/19 |

FOREIGN PATENT DOCUMENTS

| | | | |
|---|---|---|---|
| 2726361 | 12/1978 | Fed. Rep. of Germany | 429/49 |
| 3022665 | 1/1982 | Fed. Rep. of Germany | 423/98 |
| 1085736 | 10/1967 | United Kingdom | 429/49 |

Primary Examiner—Gary P. Straub
Attorney, Agent, or Firm—Christel, Bean & Linihan

[57] ABSTRACT

A method and apparatus for treating articles such as batteries in a manner permitting safe disposal thereof, each of the articles comprising a casing having reactive material therein, wherein the article casing is opened to allow access to the interior thereof, fluid is introduced to the interior of the opened casing, and any evolved gas is removed. The steps of opening the casing, introducing fluid and removing gas are performed simultaneously in a reaction vessel which is supplied with the fluid and which is in communication with gas collecting and scrubbing means. The reaction vessel preferably comprises a deluged hammermill and a tank. The hammermill is supplied with articles by a remotely fed conveyor and which discharges into a tank, fluid is supplied to the hammermill and to the tank, and the gas collecting and scrubbing means is in communication with both the hammermill and tank. The fluid preferably is water or an alkaline neutralizing solution. The gas scrubbing means can include a first stage for removing acid gases and a second stage serving as a demister. Liquid is withdrawn from the tank, filtered to remove solids and then returned. A portion of the returned liquid is supplied to the hammermill, an another portion is passed through a heat exchanger for cooling and then returned to the tank.

4 Claims, 5 Drawing Figures

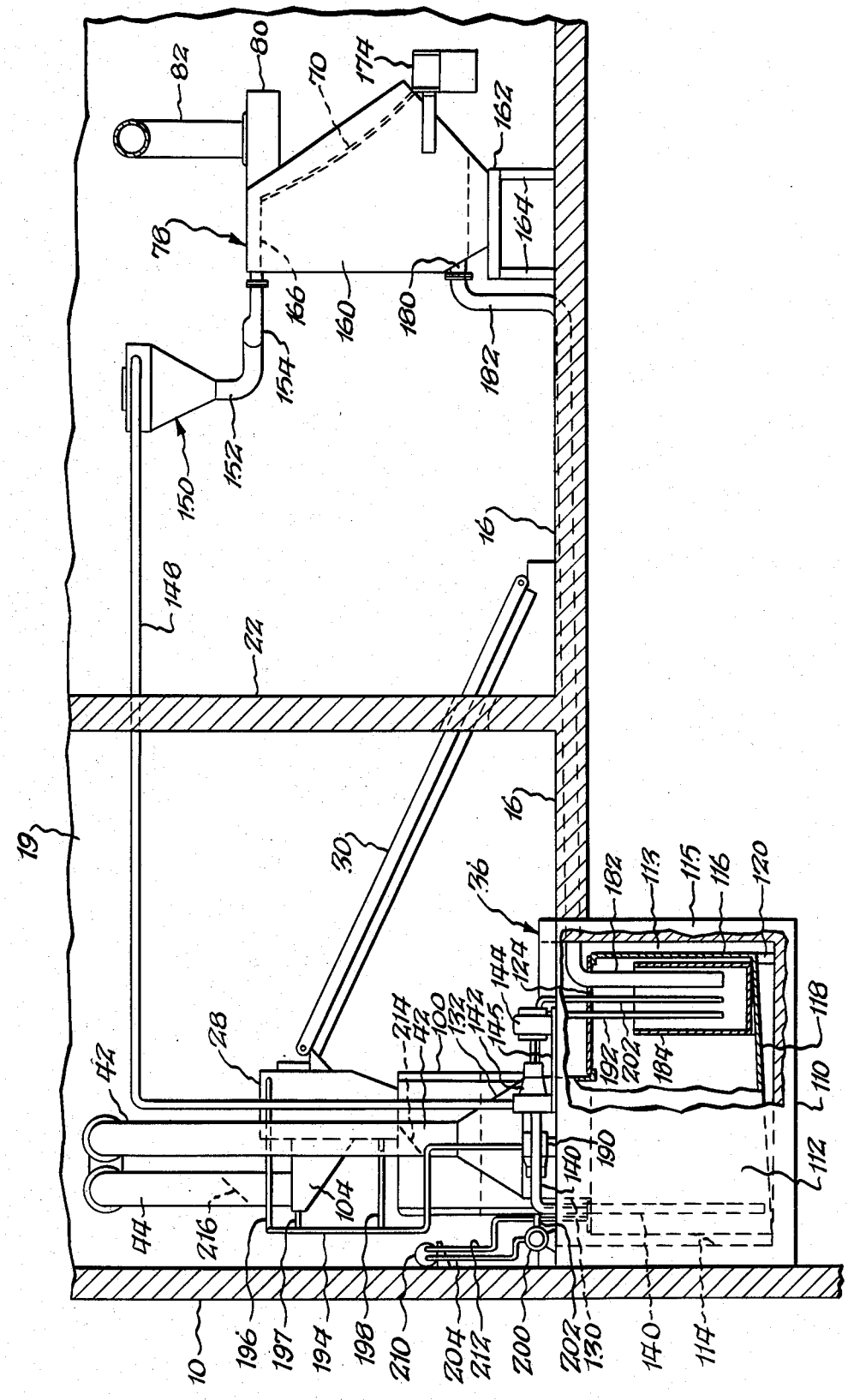

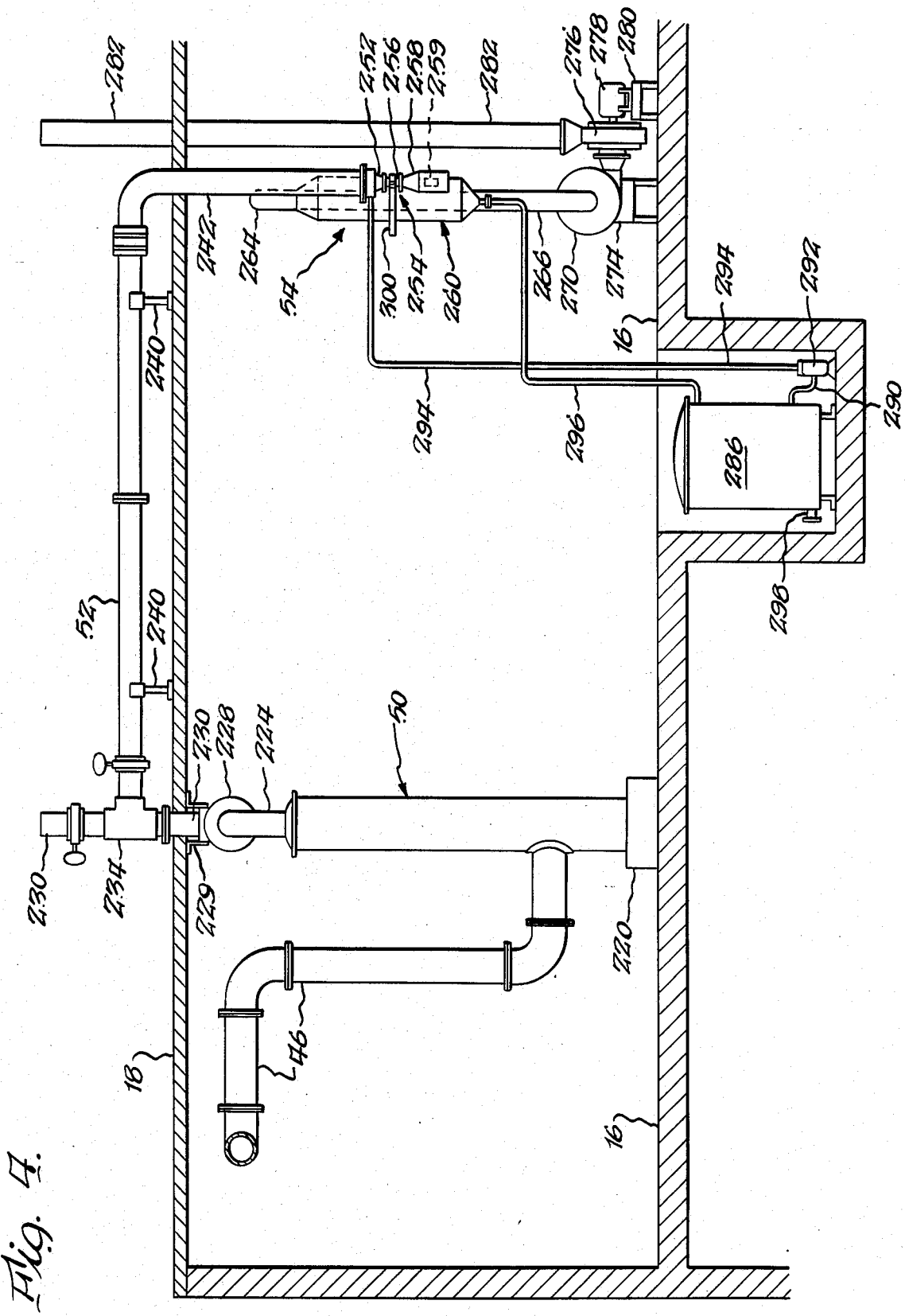

METHOD AND APPARATUS FOR NEUTRALIZING REACTIVE MATERIAL SUCH AS BATTERIES

BACKGROUND OF THE INVENTION

This invention relates to the art of neutralizing reactive material, and more particularly to a new and improved method and apparatus for treating reactive material in a manner permitting safe disposal thereof.

One area of use of the present invention is in the treatment of waste lithium electrochemical cells although the principles of the present invention can be variously applied. High energy density lithium cells or batteries are based on various chemistries, for example lithium-sulfur dioxide and lithium-thionyl chloride, and represent varying levels of potential hazard in both scrap and expended form. This is because such scrap and expended lithium cells are believed to have some uncertain elements of potential reactivity. The exact chemistry of depleted lithium cells is not well understood and in fact may be determined by the experience of the cell during use.

SUMMARY OF THE INVENTION

It is, therefore, a primary object of this invention to provide a new and improved method and apparatus for neutralizing reactive material.

It is a further object of this invention to provide such neutralization method and apparatus which allows recycling or disposal in a manner providing full accountability of the waste.

It is a more particular object of this invention to provide such a method and apparatus for treating waste lithium cells in a manner permitting safe disposal thereof.

It is a further object of this invention to provide such a method and apparatus which safely eliminates the potential reactive hazards associated with waste lithium cells.

It is a further object of this invention to provide such a method and apparatus for treating waste lithium cells in a manner permitting recycling of re-usable materials and total detoxification of the remaining waste to permit disposal.

It is a more particular object of this invention to provide a method and apparatus for destroying, neutralizing or stabilizing reactive material such as lithium cells in order to make it acceptable for either recycling or safe and permanent disposal, for example in a secure landfill.

The present invention provides a method and apparatus for treating articles such as batteries in a manner permitting safe disposal thereof, each of the articles comprising a casing having reactive material therein, wherein the article casing is opened to allow access to the interior thereof, fluid is introduced to the interior of the opened casing, and any evolved gas is removed. The steps of opening the casing, introducing fluid and removing gas are performed simultaneously in a reaction vessel which is supplied with the fluid and which is in communication with gas collecting and scrubbing means. The reaction vessel preferably comprises a deluged hammermill and a tank. The hammermill is supplied with articles by a remotely fed conveyor and which discharges into a tank, fluid is supplied to the hammermill and to the tank, and the gas collecting and scrubbing means is in communication with both the hammermill and tank. The fluid preferably is water or an alkaline neutralizing solution. The gas scrubbing means can include a first stage for removing acid gases and a second stage serving as a demister. Liquid is withdrawn from the tank, filtered to remove solids and then returned. A portion of the returned liquid is supplied to the hammermill, and another portion is passed through a heat exchanger for cooling and then returned to the tank.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 3 is an elevational view, partly in section, taken about on line 3—3 in FIG. 2;

FIG. 4 is an elevational view illustrating the gas scrubber portion of the apparatus of the present invention.

DETAILED DESCRIPTION OF THE ILLUSTRATED EMBODIMENT

Figure 1:
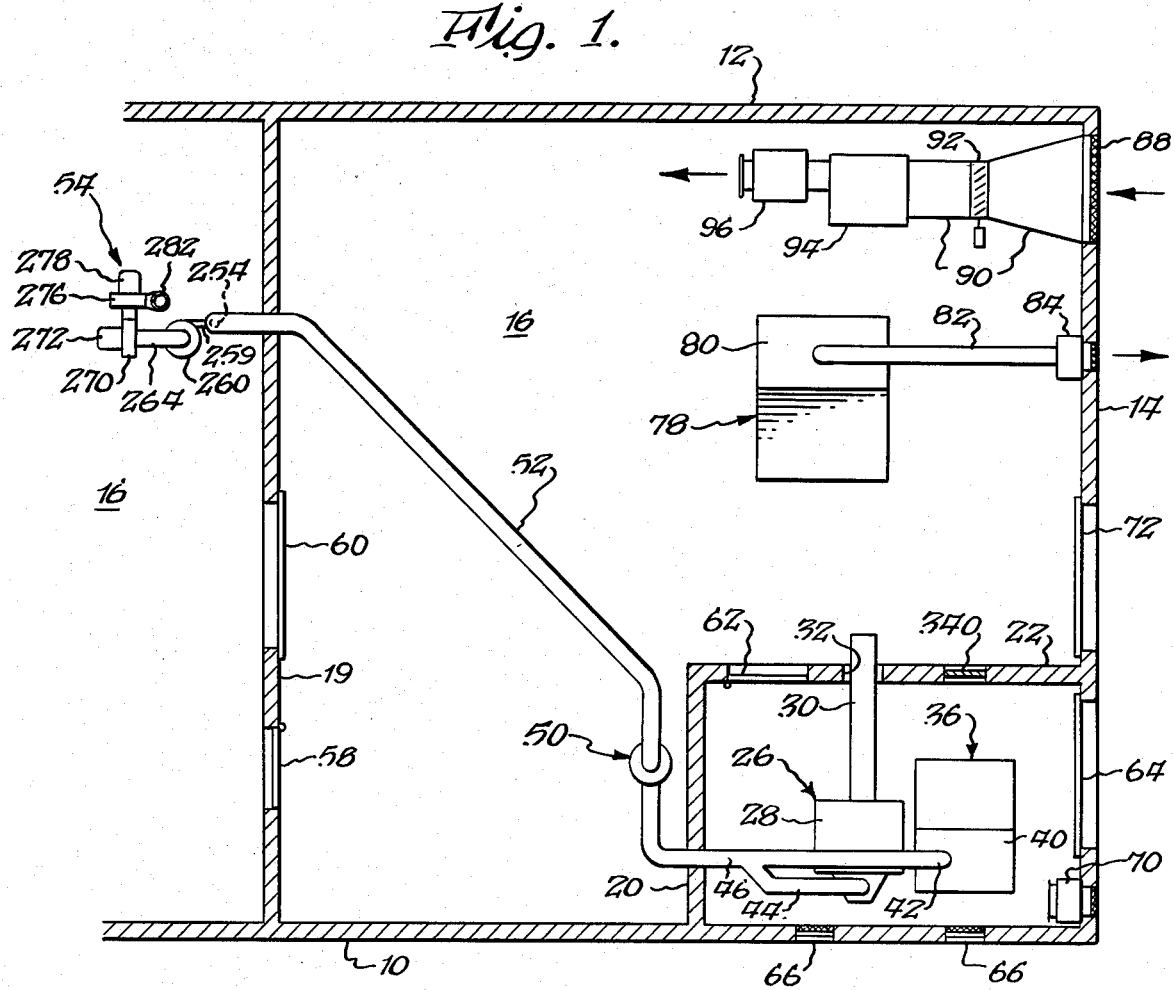
FIG. 1 is a plan view, partly diagrammatic and with some parts removed, illustrating the apparatus for performing the method of the present invention and the structural enclosures within which it is located.

The method according to the present invention for treating articles such as batteries in a manner permitting safe disposal thereof is carried out by the apparatus located within a structural enclosure, for example that illustrated in FIG. 1. The enclosure is in the form of a building having a pair of spaced apart side walls 10,12, a pair of end walls, one of which is designated 14 in FIG. 1, a floor 16 and a top or roof 18 as shown in FIG. 4. The illustrative enclosure also is provided with an intermediate wall designated 19. In the arrangement shown, there is a first region within the side walls 10,12, end wall 14 and intermediate wall 19. A second region or treatment room is defined by a pair of interior walls 20,22 meeting at right angles and joined to side wall 10 and to end wall 14, respectively as shown in FIG. 1. In other words, the treatment room is defined by side wall 10, end wall 14 and the inner walls 20,22 in the area of the lower right-hand corner as viewed in FIG. 1 where walls 10 and 14 meet.

Each of the articles such as batteries which are treated by the method and apparatus of the present invention comprises a casing having reactive material therein. The apparatus of the present invention comprises means for opening each article casing to allow access to the interior thereof. The casing opening means is in the form of a hammermill generally designated 26 and which is located within the treatment room inside of walls 20,22. The hammermill 26, which will be described in detail presently, is suitably mounted on floor 16 and is provided with a feed hopper structure 28 on the upper portion thereof. Articles to be treated are transported to the hammermill 26 by means of a conveyor generally designated 30, one end of which is associated with the input to the feed hopper 28 and the other end of which extends out through an opening 32 in wall 22 for access to the conveyor 30 from the first region outside of the room wherein they are treated by the method and apparatus of the present invention.

The apparatus of the present invention further comprises means for introducing fluid to the interior of each opened casing whereby the fluid serves to neutralize the active material in each casing. Preferably the fluid is a liquid and such liquid can be water or an alkaline neutralizing solution, for example a saturated solution of sodium carbonate. The fluid is supplied to various locations in the feed hopper 28 and to a location near the entrance to hammermill 26 near the bottom of feed hopper 28. After the casings are opened or pierced by hammermill 26 and possibly also shredded, they are transferred to a container or tank generally designated 26. In particular, the discharge outlet of hammermill 26 is in communication with tank 36. Tank 36 also preferably includes a quantity of the neutralizing fluid in the form of a liquid in a manner which will be described in detail presently. The fluid is supplied to various locations in the feed hopper 28 and to a location near the entrance to hammermill 26 near the bottom of feed hopper 28. After the casings are opened or pierced by hammermill 26 and possibly also shredded, they are transferred to a container or tank generally designated 36. In particular, the discharge outlet of hammermill 26 is in communication with tank 36. Tank 36 also preferably includes a quantity of the neutralizing fluid in the form of a liquid in a manner which will be described.

The apparatus of the present invention further comprises means for removing any gas evolved as a result of the foregoing operations including opening of the article casings. In particular, there is provided gas collecting and scrubbing means, and tank 36 is provided with a gas collector in the form of a fume hood generally designated 40. A first branch conduit 42 leads from hood 40 for conveying collected gases therefrom. A second branch conduit 44 leads from the hammermill 26 feed hopper 28 and joins branch 42 in a main duct or conduit 46 which extends out through wall 20 to a first gas scrubbing means in the form of a packed tower generally designated 50. Tower 50 and other components associated therewith will be described in further detail presently. The output of tower 50 is conveyed by a conduit 52 extending across the area and through wall 10 to another gas scrubbing means generally designated 54 which will be described in detail presently.

As shown in FIG. 1, wall 19 is provided with a hinged door 58 and a sliding door 60. Access to the treatment room within walls 20,22 is provided by a hinged door 62, and communication between the treatment room and the outside of the building is provided by means of a sliding door generally designated 64. The sliding door also provides blowout protection in a manner which will be described. Controlled louvers 66 are located in the portion of side wall 10 associated with the treatment room, and a controlled fan 70 is provided in the portion of wall 14 defining the room. This fan provides emergency exhaust from the region in a manner which will be described. A sliding door 72 in wall 14 provides communication between the outer region of the building interior and the outside. A screening or filtering apparatus generally designated 78 is located within this region and is connected to the treating apparatus in a manner which will be described. It is provided with a hood 80 for collecting fumes which then are exhausted through a duct 82 by means of an exhaust fan 84 associated with an opening in wall 14. The outer region of the building interior is maintained at a positive pressure with respect to the treatment room containing the treating apparatus for reasons of safety which will be described in detail presently. To this end, there is provided an air intake 88 in wall 14, a duct 90, a damper 92, an intake fan 94 and a heater 96.

Figure 2:
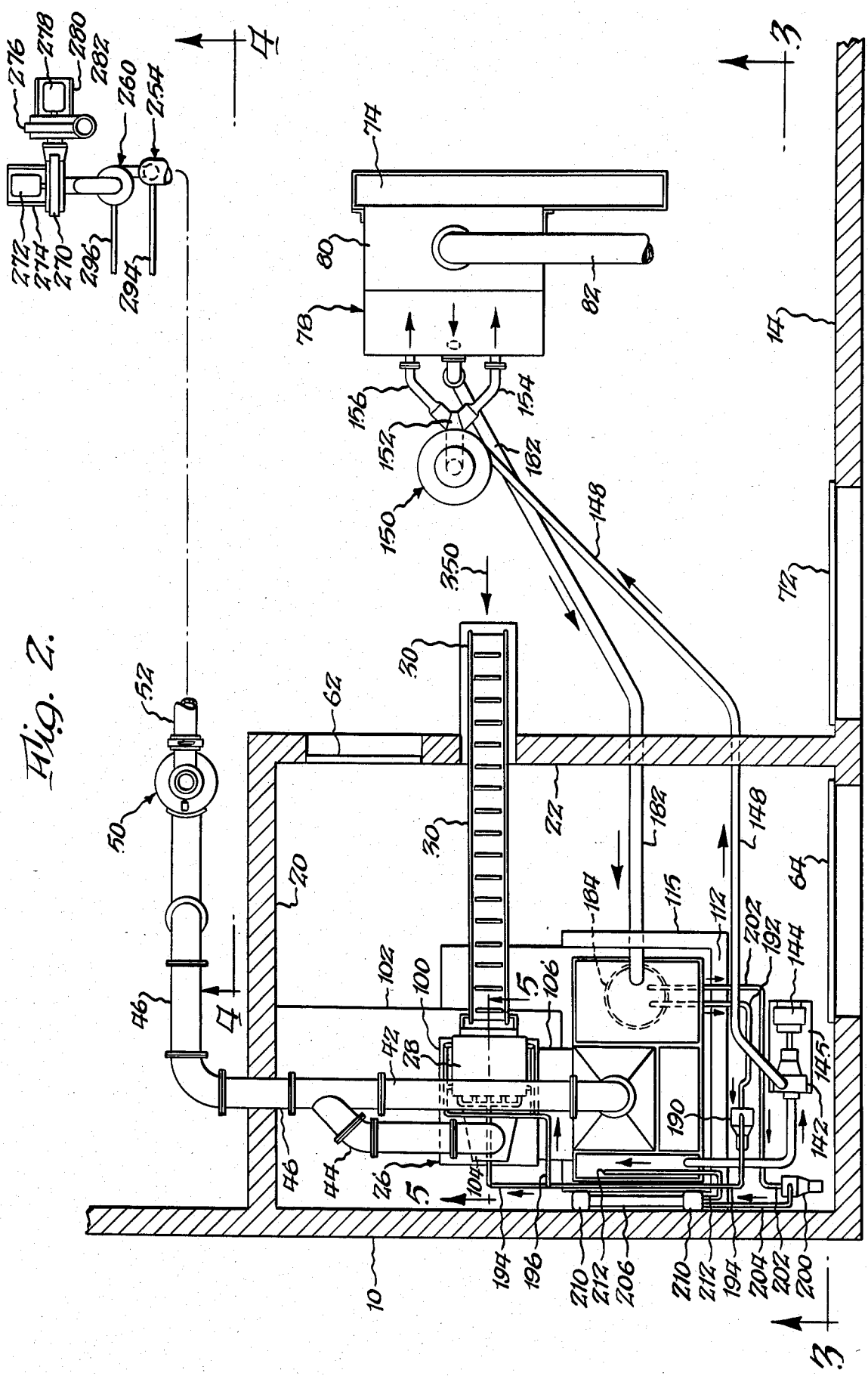
FIG. 2 is a plan view partially in section and with parts removed illustrating the apparatus according to the present invention.

Referring now to FIGS. 2 and 3, hammermill 26 includes a main body portion 100 which is mounted on floor 16 within the treatment room by means of a thrust block 102. The feed hopper 28 of the hammermill is provided with an elbow 104 for connection to the exhaust branch conduit 44. The lower region of the hammermill 26 adjacent the thrust block 102 is provided with a discharge chute structure 106. By way of example, in an illustrative apparatus, hammermill 26 is a 100 horse power Williams hammermill model no. C32, the type and size being selected on the basis of the need to rip open both batteries and sometimes associated equipment made primarily of stainless steel and aluminum, to pelletize these materials to pass a ¾ inch screen, and to withstand the rapid oxidation of lithium components. Hammermill 26 is fed by conveyor 30 with components or batteries being placed by hand onto conveyor 30. The drive motor of 100 horse power size for hammermill 26 will run very lightly loaded, normally with very infrequent substantial peak loads. The hammermill discharges through the chute 106 into tank 36, and the hammermill is supplied with a neutralizing fluid, such as water or alkaline neutralizing solution, through a series of openings in feed hopper 28 and elbow 104 in a manner which will be described presently. Upon entering and flowing through the hammermill 26, the liquid discharges into tank 36. A high PH neutralizing solution serves to provide water for desired neutralizing reactions in the method as well as retarding the normal rate of reactions to rates more compatible with the equipment capabilities. In addition, the neutralizing solution serves a two-fold cooling purpose. The first is to serve again as a reaction retardant because of the cooler temperature of the solution, and the second is to condense a portion of the various vapors and mists formed both by the physical action of hammermill 26 as well as by the chemical reactions occurring in the apparatus.

As shown in FIG. 3, tank 36 is located below floor 16 and is in communication with the discharge chute 106 of hammermill 26. The tank is in the form of a metal structure located within a water-tight concrete floor well. In particular, the concrete outer structure or well includes a bottom wall 110 located below and substantially parallel to floor 16, a pair of upstanding side walls 112,113 and a pair of upstanding end walls 114,115. In the illustrative apparatus, tank 36 is hollow rectangular in shape. The inner metal structure is of corresponding shape, spaced slightly inwardly of the concrete well, and includes upstanding side walls and end walls, one end wall being designated 116 in FIG. 3. The bottom wall 118 is sloped to one corner of the tank, i.e. the lower left-hand corner as viewed in FIG. 3, to facilitate solids removal in a manner which will be described. The metal walls of the inner tank structure are welded together and are heavy, i.e. being formed for example from one-half inch steel plate. In addition, the metal walls can be coated with an epoxy material to withstand possible substantial corrosion, erosion and chemical reaction pressures which may be encountered under varying operating conditions. The bottom 118 of the metal tank is supported relative to the well bottom 110 by a structural block 120 as shown. A removable cover 124 generally in the form of a metal plate extends over approximately half of the top area of the inner metal tank. Another portion of the tank top is in communication with the fume hood 28 which includes a lower hollow rectangular structure 130 which rests on the top of the metal tank and an inwardly sloping structure 132 which provides a transition from the structure 130 to an upwardly extending portion of duct 42. The remaining portion of the tank top is covered by a metal plate 136.

Thus, the inner tank is in a water tight concrete floor well and the floor of the well can be sloped to one corner (not shown in FIG. 3) to permit easy monitoring of any possible overflow or leakage. There is no drain from the concrete wall or enclosure and any spillage must be neutralized and cleaned out manually. The inner tank has no piping fittings through it but rather all fluid circuits flow over the tank top for both suction as well as discharge purposes in order to minimize the opportunity for problems of leakage. The opened and ground or pelletized articles leave the discharge chute 106 of hammermill 26 and enter the tank which contains the neutralizing liquid, preferably an alkaline solution. By way of example, in an illustrative apparatus, the inner tank is of a size capable of containing 500 gallons of liquid. The particulate solid material settles toward the bottom of the inner metal tank, and the liquid containing such solids is withdrawn from the tank in the following manner.

There is provided a conduit 140 supported in a suitable manner having a generally vertical portion located in the tank 36 and terminating near the lower-most portion of the downwardly sloping wall or bottom 118. The vertical portion of conduit 140 extends upwardly through tank 36 and outwardly of the top meeting a right angle bend as shown in FIG. 3. The conduit has a generally horizontal portion which extends parallel to the floor 16 and is connected to the input of a pump 142 driven by a motor 144. Pump 142 and motor 144 are mounted as a unit on a base 145 fixed to floor 16. Pump 142 is a self-priming trash pump, and one pump found to perform satisfactorily in the method and apparatus of the present invention is a Gorman Rupp self-priming trash pump available commercially under model no. 13A2-B. Pump 142 can be of steel and fitted with ceramic mechanical seals to accomodate a high Ph neutralization liquid. Pump 142 provides a flow of approximately 200 gallons per minute and can accomodate solids having a cross sectional size up to about 1½ inch in generally spherical shape. With the screen of hammermill 26 being sized at about ¾ inch, the result is that pump 142 can accomodate all solids flowing through the system. Pump 142 is also provided with a readily detachable face in the event that it is necessary to clear the pump of an occasional bridging of solids.

The output of pump 142 is connected to one end of a conduit 148 which extends upwardly within the treatment room then through a substantially right angle bend and generally horizontally and parallel to floor 16 through the wall 22 whereupon it connects to the tangential inlet of a conical-shaped flow control device or receiver generally designated 150. Device 150 creates a swirling flow tending to reduce the speed of the fluid therethrough. The device has an outlet 152 adjacent the bottom thereof which, in turn, is connected by a pair of conduits 154,156 to inputs of the screening or filtering apparatus generally designated 78.

The filtering and screening apparatus 78 includes a housing 160 which rests on a base 162 supported on floor 16 by a plurality of leg members 164. Within housing 160 is an upper flow directing surface 166 in fluid communication with the inlet conduits 154,156. The apparatus 78 includes a screen 170 within housing 160 which screen is slightly inwardly concave and extends from the flow directing surface 166 generally downwardly toward the lower region of housing 160. Screen 170 terminates adjacent a front edge portion of the apparatus which, in turn, is located adjacent a trough 174 for collecting removed solids. The filtered liquid flows from screen 170 into the interior of housing 160 whereupon it collects in the lower region thereof and flows outwardly through an outlet 180.

One form of filtering and screening apparatus 78 found to perform satisfactorily is commercially available from Sweco, Inc. under the designation Sta-Sieve Model No. SV-6S. It is a static screening device having a stainless steel shell 160 with screen 170 having 0.010" slots and being of stainless steel. The separated solids leave the front edge of the apparatus and are collected in trough 174. The fluid fraction flows by gravity downwardly from screen 170 and ultimately through outlet 180.

The filtered liquid is returned through a conduit 182 extending along within floor 16 which conduit includes a right angle bend and extends downwardly into the metal tank and into a container 184 located within the tank. Thus, the liquid within the container 184 is substantially free of solid or particulate contamination as compared to the liquid in the remainder of the tank.

The apparatus of the present invention further comprises means for introducing fluid to the interior of the opened casings, the fluid, preferably a liquid, serving to neutralize the reactive material therein. The filtered neutralizing liquid is conveyed from within container 184 to the hopper area of hammermill 26. As shown in FIG. 3, there is provided a pump 190 mounted on floor 16 within the treatment area and a conduit 192 is connected at one end to the inlet of pump 190 and extends along generally parallel to floor 16 and has a right angle bend and extends downwardly into the container 184 terminating a short distance from the bottom thereof. The outlet of pump 190 is connected to one end of a conduit 194 which, as shown in FIG. 3, has a first portion extending generally vertically and upwardly from pump 190, a second portion extending generally horizontally and toward the outer wall 10, a third portion extending generally vertically and further upwardly, and a fourth portion extending generally horizontally and inwardly toward hopper 28 whereupon it terminates in a plurality of branch conduits entering into the upper region of hopper 28 at spaced locations therealong as shown in FIG. 2. Branch 196 connected to conduit 194 extends toward hopper 28 and leads to a pair of branch conduits connected to a plurality of opposed ports on the opposite sides of the upper portion of hopper 28. Additional branch conduits 197 and 198 lead from conduit 194 to elbow 104 and to the lower region of hopper 28, respectively. Thus, the neutralizing liquid is injected into the hopper 28, elbow 104 and inlet of hammermill 26 to provide the functions previously described. In addition, when the liquid is a high Ph neutralizing solution, it tends to limit corrosion in the hopper, hammermill and hood for corrosion control. By way of example, in an illustrative apparatus, pump 190 is a deluge pump having a capacity of approximately 60 gallons per minute.

In order to cool the neutralizing liquid within tank 36, it is transferred from the tank to a heat exchanger wherein it flows in heat transferring relation to a cooling fluid and then is returned to the tank. In particular, a pump 200 is mounted on floor 16 and the inlet is connected to one end of a conduit 200 which extends generally horizontally and parallel to floor and toward tank 36 whereupon the conduit extends vertically downwardly into the container 184 generally parallel to the conduits 182 and 192 as shown in FIG. 3. The end of conduit 202 is spaced a short distance above the bottom of container 184 similar to the end of conduit 192. The outlet of pump 200 is connected to one end of a conduit 204, the other end of which is connected to the inlet of a heat exchanger 206 mounted on wall 10 by brackets 210. The outlet of heat exchanger 206 is connected to one end of a conduit 212, the other end of which extends downwardly into tank 36 for returning cooled liquid thereto. The cooled liquid is returned to the upper region of tank 26 as viewed in FIG. 3 and at the end generally opposite the location of container 184. Pump 200 is of the small, self-priming type having stainless steel parts in view of the fact that the high Ph neutralizing solution serves as a rust inhibitor for steel. The pump 200 transfers the neutralizing liquid from the interior of container 184, where the liquid is present without high levels of precipitates or heavy particles, to the cooler heat exchanger. Return flow is back to the tank 36, and circuit head requirements are kept as low as possible. Heat exchanger 206 is of the tube type, of stainless steel material, and has a rating of 200,000 BTU per hours. One form of heat exchanger 206 found to perform satisfactorily is commercially available from Hydro-Flor Products, Inc. under the designation Model HST and is of the four pass variety.

The cooling liquid used in heat exchanger 206 can be from various sources, and it has been found advantageous to employ well water. In an exemplary installation, a cooling water well was drilled to provide non-contact cooling for air conditioning of other areas of the building. In this illustrative example, the well water flow is about 20 gallons per minute maximum. After passing through the air conditioning coil where the temperature is approximately 51° F. up to a maximum of 58° F., the flow is transferred to the heat exchanger 206. The temperature then will rise further to a maximum of 98° F. before being discharged to the environment. The average blended discharge temperature is estimated to be about 75° F. under loaded conditions.

For reasons of safety to preclude any chance of cooling water contamination, the high Ph neutralizing solution is transferred through the heat exchanger at very low circuit pressure. The well water coolant is transferred through the heat exchanger with a throttling valve on the output in order to maintain coolant pressures inside the heat exchanger at levels significantly higher than the neutralization fluid circuit pressures so that in the event of any leaks, such leakage would be toward the neutralizing tank 36 rather than toward the cooling water. The neutralizing tank liquid level is continuously monitored.

The apparatus of the present invention further comprises means for removing any gas evolved as a result of the treatment process. The fume hood 40 collects any gas evolved from the neutralization reactions occurring in tank 36 and directs the gas into branch conduit 42.

Similarly, the elbow 104 associated with the hammermill feed hopper 28 collects any gas from the portion of the neutralization reactions taking place in hammermill 26 and discharge chute to the tank 36 and directs such gases to branch conduit 44. Conduits 42 and 44 are provided with dampers 214 and 216, respectively, which are adjustable and set according to desired flow conditions depending upon the nature of the neutralization reaction taking place. The branches 42,46 are joined into a main conduit 46 which extends through wall 20 as shown in FIGS. 1 and 2 and, in the illustrative apparatus shown, extends first generally horizontally then downwardly vertically as shown in FIG. 4 whereupon it is connected to the inlet of a gas scrubber generally designated 50 in the form of a packed tower. Tower 50 is mounted on a base 220 which rests on floor 16. Tower 50 serves to remove acid gases from the stream, and in the present illustration is a chemically resistant, fiberglass reinforced plastic packed tower. The tower 50 is selected to have the capability of cleaning a wide spectrum of neutralization products plus acid mists from the exhaust gas prior to further treatment. Scrubbing fluid for tower 50 also preferably is a high Ph solution plus such other chemicals as may be required to react various contaminents to convert them to evironmentally acceptable and inert materials. All make-up water for tower 50 can be introduced at the top thereof, and any overflow can be collected and supplied to the tank 36. By way of example, an illustrative apparatus, tower 50 can be of the type commercially available from Heil Process Equipment Company under the designation Model 730 packed power.

The scrubber 50 is cooled to assure condensing of all vapors so that they are removed from the exhaust to improve the environmental quality of the off gas and to improve the operation of the gas scrubbing system. Liquid is withdrawn from the lower portion of tower 50 by action of a pump and circulated through a heat exchanger similar to heat exchanger 206, and cooled liquid is returned to tower 50. Well water can be used for the cooling liquid and the heat exchanger will employ the same method for protection against contamination as used in heat exchanger 206.

The outlet of tower 50 is connected by a conduit 224 to the inlet of an exhaust blower generally designated 228 for moving gas from tower 50 to a further stage in the treatment arrangement. Blower 228 is selected to have an air quantity rating providing a safety factor adequate for control of hydrogen concentration in the gas flow. One form of blower 228 found to perform satisfactorily is available commercially from Heil Process Equipment Company under the commercial designation Heil Plastic Centrifugal Fan having ratings HCL 8 or HCL 10. As shown in FIG. 4, the outlet of fan 228 is connected to a conduit 230 which extends through roof 18 and is open to the atmosphere under control of a valve 232. In conduit 230 there is a T connection 234 which provides a connection to the conduit 52 under control of a valve 238. Conduit 52 extends generally horizontally and parallel to roof 18 externally thereof in the illustrative arrangement shown and is supported by brackets 240. It joins another branch 242 extending downwardly through roof 18 and connected to the input of the second gas scrubbing means generally designated 54.

The second scrubbing means 54, which comprises the combination of a Venturi section and a cyclone separator, serves primarily as a demister in co-operation with packed tower 50 which removes acid gases from the stream. In particular, conduit 242 is connected to the inlet section 252 of a Venturi scrubber generally designated 254. The inlet 252 leads to a throat 256 which, in turn, communicates with an outlet section 258 of the Venturi. Outlet 258 is connected by a passage or duct 259 to the inlet of a cyclone separator generally designated 260. Passage 259 has a longitudinal axis disposed at about a right angle to the longitudinal axes of Venturi scrubber 254 and separator 260. By way of illustration, the combination of Venturi scrubber 254, duct 259 and cyclone separator 260 is available commercially as a unit from the W. W. Sly Manufacturing Co. Separator 260 is supported in a suitable manner, such as by generally vertically disposed support beams (not shown) each fixed at one end to floor 16 and at the other end to the housing of scrubber 260. Also, Venturi scrubber 254 can be mounted to cyclone separator 260 by a bracket (not shown).

The output of separator 260 is connected to gas moving means for moving gas from conduit 242 through Venturi scrubber 254 and cyclone separator 260 and ultimately to the atmosphere. In particular, the outlet end of separator 260 is connected through an elbow to a first fan 270. Fan 270 is driven by an electric motor 272 (shown in FIG. 2) supported on a base 274. The output of fan 270 is connected to the input of a second fan 276 driven by an electric motor 278 supported on a base 280. The output of fan 276 is connected to a duct or stack 282 for exhausting cleaned gas to the atmosphere. By way of illustration, fans 270,276 can be of the type commercially available from New York Blower Co. under the designation N23P-15. The combination of fans 270,276 and the respective two fan drive motors 272,278 provides two 15 hp induced draft fans in series to provide the needed high pressure with the low volume involved in the illustrated apparatus.

Liquid, for example water, is injected into the gas stream flowing through Venturi scrubber 254 and collected liquid is removed from separator 260 by the following arrangement. A tank 286 is located for convenience in a pit below the surface of floor 16. Liquid is withdrawn from tank 286 through a pipe 290 by a pump 292, and the liquid is conveyed from pump 292 through a pipe 294 to distribution openings in the inlet section 252 of Venturi scrubber 254. Liquid collected in the lower or hopper portion of separator 260 is returned to tank 286 by means of a pipe 296, one end of which is connected to the lower end of separator 260, the other end of which is connected to the lower end of separator 260, the other end of which is connected to the upper portion of tank 286. A normally closed fitting 298 is provided adjacent the bottom of tank 286 for removing any sediment which collects at the bottom, this being accomplished by opening fitting 298 and connecting a conduit and pump (not shown) to the fitting for withdrawing the sediment and conveying it to a suitable collection or storage vessel.

The gas scrubbing means 250 operates in the following manner. Gas is moved from conduits 52,242 through the inlet section 252 of Venturi scrubber 254 by the operation of fans 270,276. Liquid such as water is introduced to the gas stream by means of pipe 294 and the distribution openings previously described, in particular the liquid flows along the inner surface of the inlet section 252 toward throat 256. The gas is accelerated to a high velocity at the scrubber throat 256 where in comes into contact with the scrubbing liquid. The liquid is atomized into a mass of the fine droplets which entrap particulates and absorb gaseous pollutants. In the outlet section 260 downstream from throat 256 the cleaned gas decelerates, and the particulate-laden liquid droplets collide and agglomerate. The difference in horizontal levels between the bottom of scrubber 254 and the lower wall of duct 259 defines a right-angle elbow which is flooded by the liquid. The large, heavy agglomerated droplets are driven into the flooded elbow for easy disposal as the liquid overflows the elbow and then flows down along the bottom portion of separator 260 to pipe 296 and ultimately to tank 286. Ultra-fine droplets, too small for impingement collection at the flooded elbow, are collected in separator 260 to complete the cleaning operation. In particular, the gas stream including the liquid droplets containing the particulates enters cyclone separator 260 wherein the droplets fall to the lower or collecting region thereof as the gas flows upwardly in a sprial, tangential fashion as is well known. Any contaminant particles not contacted by liquid are directed by centrifugal force into the rising column of water in cyclone 260 and ultimately are collected in the lower portion thereof. The cleaned gas continues its flow through the remainder of the system whereupon it is exhausted from duct 282 typically to the atmosphere. The liquid containing the particulate contaminants is removed from the lower portion of cyclone separator 260 through pipe 296 to tank 286, from which sediment is removed periodically as previously described. Liquid from tank 286 is returned to Venturi scrubber 254 thoough pipe 294 and by action of pump 292 thereby providing a recirculating liquid supply system.

In an illustrative apparatus which valve 232 closed and with conduits 52,242 each having an inner diameter of about 10 inches, with duct 266 having an inner diameter of about 8 inches, and with the exemplary Venturi scrubber 254, cyclone separator 260 and fans 270,276, the scrubber system 54 is under vacuum with the capability of pulling about a sixty inch column of water. In the foregoing illustrative arrangement, the provision of two fans in series provides the maximum pressure drop with the minimum amount of gas movement, in view of the low volume of gas flow encountered in the illustrative arrangement of the indicated size. In other words, in the arrangement of the present invention, two lower speed fans in series are employed rather than one higher speed fan to obtain high pressure at low volume. Pressure drop across Venturi throat 256 of scrubber 254 is a measure of the energy needed to atomize the scrubbing liquid and to perform the cleaning operation; the higher the pressure drop, the higher the collection efficiency in removing particulate material. The pressure drop can be varied by adjusting the throat size by means of a manually-operated lever designated 300 in FIG. 4. In addition to removing particulate contaminants from the gas leaving conduits 236,242, the foregoing arrangement also cools the gas before it is exhausted from duct 282.

Figure 5:
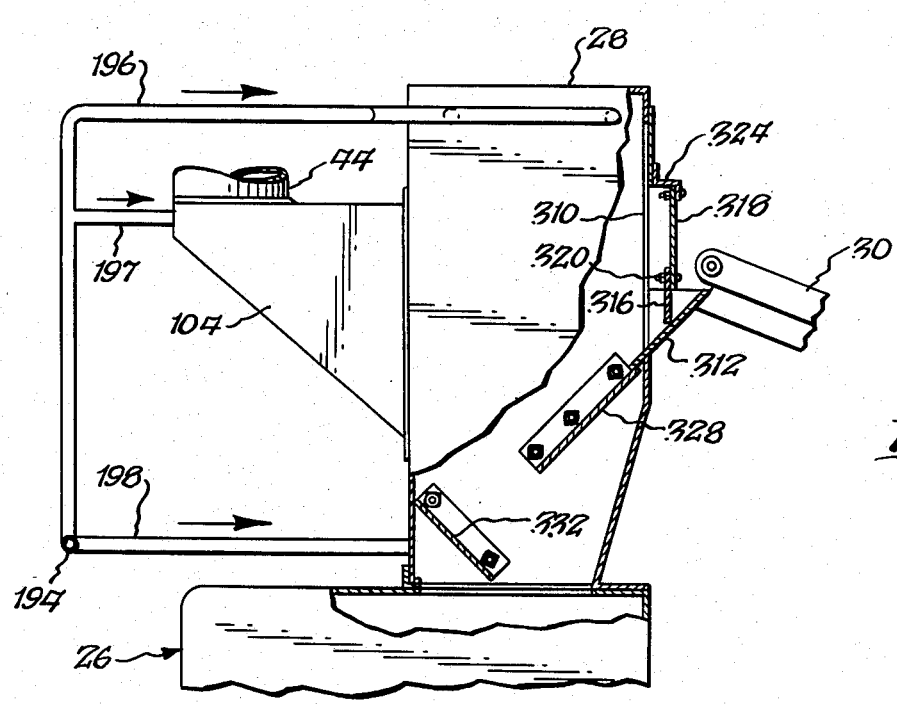
FIG. 5 is a fragmentary elevational view, partly in section, taken about on line 5—5 in FIG. 2.

Turning now to the portion of the method and apparatus relating to feeding in of materials to be processed, as shown in FIG. 5, the upper end of conveyor 30 is located adjacent an opening 310 in the wall of feed hopper 28. A guide plate 312 of metal or the like extends from the end of conveyor 30 through opening 310 in a downward direction and terminates a short distance inwardly of the wall. Thus, as articles such as batteries leave the end of conveyor 30 they fall onto plate 312 and are guided downwardly into hopper 28. The opening 310 is closed by a flap of neoprene or like flexible material comprising two sections or parts 216,218 which are joined together by removable fasteners 320, the entire flap being fastened to a bracket 324 extending along the upper edge of opening 310. As the articles such as batteries fall from conveyor 30 onto plate 312 the flap is pushed inwardly allowing the articles to travel into hopper 28. When the lower flap section 316 becomes worn it can be removed easily for replacement. A first baffle 328 is mounted within hopper 28 near and below opening 310 and inclined as shown in FIG. 5 so as to be disposed substantially parallel to plate 312. A second baffle 332 is mounted within hopper 28 near the opposite side, below baffle 338 and near the entrance to hammermill 26. Baffle 332 also is inclined and is disposed in a plane generally perpendicular to the plane of baffle 328. The baffles 328,332 serve to confine any upward travel of whole or shredded articles from hammermill 26 during operation. The baffles 328,332 also intercept liquid propelled upwardly by the rotating hammermill blades and divert such liquid downwardly back through the hammermill.

The provision of conveyor 30 adequately isolates personnel from the treatment process. Conveyor 30 extends through opening 32 in treatment room wall 22, and one end of conveyor 30 is adjacent feed hopper 28 within the treatment room as previously described. The opposite end of conveyor 30 is within the outer room, isolated from the interior of the treatment room, and conveyor 30 is loaded manually adjacent such opposite end by persons within the outer room. Such manual loading also permits close monitoring of the feed rate to the condition of the neutralization processes taking place. In addition, the drive for conveyor 30 is interlocked with the motor for driving hammermill 26 to prevent overloading of the hammermill.

All components of the apparatus, except scrubber 50 and 54 and screen 78 are located within the treatment room walls 20,22 which separate personnel in the outer room from the process taking place within the treatment room. Walls 20,22 can be of 12 inch concrete block with the cores filled with motar and having horizontal reinforcement. Door 61 can be interlocked with the process equipment whereby some or all of the components can be shut off upon opening of door 62. A window 340 of safety glass is provided in wall 22 for viewing and inspecting the equipment and process from outside of the treatment room.

The controlled fan 70 in wall 14 provides exhaust from the interior of the treatment room to the outside. Fan 70 operates separately from the gas collecting and scrubbing means and can operate while the process is running an can be interlocked with the process. Typically, fan 70 is provided as an emergency exhaust for use in the event of a failure of scrubber 50 or other components in the gas collecting and scrubbing means. The pair of interlocked and controlled automatic dampers 66 in wall 10 are provided for the same purpose, in the event of an emergency condition in the treatment room. The overhead door 64 occupies most of the end wall portion of the treatment room. Door 64 provides access to the process equipment and also serves as a blow out wall in the event of any explosion occurring within the treatment room.

The outer region of the building interior is maintained at a positive pressure relative to the interior of the treatment room. This provides a safety measure against any leakage of gas out from the treatment room and thus protects personnel in the outer region. This is accomplished by the operation of air intake 88 in wall 14, duct 90, damper 92, intake fan 94 and heater 96. Outside air is drawn in by fan 94 under control of damper 92 and heated to create a higher pressure external to the treatment room.

The apparatus of FIGS. 1-5 is operated to perform the method of the present invention in the following manner. Articles to be treated such as used or waste batteries are placed on the portion of conveyor 30 within outer room of the building structure, and they are moved by conveyor 30 toward the treatment room in the direction indicated by the arrow 350 in FIG. 2. The batteries are moved by the conveyor through the opening 32 in the treatment room wall 22 and to the opposite end of the conveyor whereupon they leave the conveyor 30 and enter the treatment apparatus. In the treatment apparatus, the battery casings are opened to allow access to the interior thereof, neutralization liquid is introduced to the interior of the opened casing to neutralize reactive material therein, and any gas evolved as a result of the neutralization process is removed. In particular, the batteries drop downwardly from the end of conveyor 30 and fall against the flap 316,218 onto guide plate 312 and thus into the feed hopper 28. The batteries fall further downwardly into hammermill 26 wherein the casings thereof are at least pierced and usually torn or ripped opened and then the casings and associated components and material are shredded into smaller pieces of solid material. The neutralization liquid entering hopper 28 from the various locations contacts the articles as they are opened and shredded thereby initiating the neutralization reactions. Thus, the liquid is introduced to the interiors of the opened casings and serves to neutralize the reactive material therein. The neutralization reactions continue as the opened and shredded casings and material are propelled through the hammermill discharge outlet 106 into the tank 36 with the quantity of neutralization liquid therein.

In particular, the flow of neutralization liquid is accelerated by the rotation of the hammermill blades and this speeded up flow of liquid serves to flush and scrub the hammermill and carry away shredded material out from the hammermill 26 and discharge outlet 106. The liquid also serves as a lubricant for the hammermill.

Thus the combination of the deluged hammermill 26 and tank 36 may be viewed as a reaction vessel in the form of a large shredding-hydrolysis apparatus. In addition, it is provided with gas scrubbing capabilities. Gases released during the neutralization reactions occuring in hammermill 26 and in tank 36 are collected by the hood 40 and elbow 104 conveyed through conduits 42,44 and 46 to the first scrubber wherein acid gases are removed as previously described. The gas then is moved further along conduit 50 to the second scrubbing means 54 which acts as a demister to further treat the gases prior to exhaust to the environment. Thus, toxic and corrosive emissions from the neutralization process are scrubbed for reasons of safety and environmental considerations. During the foregoing treatment process, neutralization liquid containing solid particulates is withdrawn from tank 36 through conduit 140 by operation of the trash pump 142 and is conveyed to the screening and filtering apparatus 78 in a manner previously described whereby the particulate solid material is removed from the liquid and transferred to trough 174 and then filtered and screened liquid is returned along conduit 182 to tank 36 where it is received in container 184. The removal of particulates from the neutralization liquid in tank 36 prevents clogging of the other pumps in the system such as the deluge pump 190 and the heat exchanger pump 200. This, in turn, enables the personnel associated with the apparatus to avoid the need to actually handle the batteries or similar articles placed on conveyor 30. In other words, the operating personnel do not have to sort the material or manually remove wrappers, tapes containers and other extraneous matter supplied to conveyor 30. Instead, all such material simply can be dumped on conveyor 30 at the input end along with the batteries. As a result, the shredded solid material provided by operation of hammermill 26 is removed by the filtering apparatus 78 and does not interfere with operation of the liquid system. The liquid introduced to the feed hopper 28 and elbow 104 is obtained from container 184 where it is substantially free of solids and transported by operation of pump 190 as previously described. The liquid within tank 36 is cooled by operation of the heat exchanger in the manner previously described.

Thus, the neutralized, solid particulate material can be removed from trough 174 at the outlet of filter 78 and is suitable for safe and sanitary disposal. Any toxic or otherwise harmful gaseous emissions from the treatment process are removed by the gas scrubbing means 50,54. The remotely fed hammermill 26 and neutralization tank 36 are confined within the treatment room and isolated from operating personnel for added safety.

The present invention is illustrated further by the following example.

EXAMPLE

Various types and sizes of lithium batteries were obtained from various users and manufacturers for destruction and disposal. The foregoing method and apparatus described hereinabove was employed for the shredding and hydrolysis of these batteries in the following manner.

First various steps were taken for preparation of the shredding-hydrolysis unit. Connection was made to the stack 242 leading to the venturi 254 and cyclone scrubber 260. The volumes of water in the hydrolysis tank 36, packed tower scrubber 50, and venturi scrubber 254 were adjusted so that they were adjusted so that they were 400 gallons, 20 gallons and 80 gallons, respectively. The pH of the afore-mentioned systems were measured and were recorded as follows:
 hydrolysis tank water—pH 14 (0.1 normal NaOH)
 packed tower scrubber—pH 14 (2.7 5 normal NaOH) and,
 venturi scrubber—pH 9.4

Well water used to cool the various heat exchangers was turned on and pressurized to greater than 40 psi. In the equipment room, all 480 volt and 110 volt circuit breakers were turned on to provide power to the shredding-hydrolysis system and to the venturi-cyclone scrubber system.

The control panel switch was turned on and each trouble light was pushed to assure readiness of the safety circuits. Prior to pressing the reclaim pump switch, the receiving drum as the Sweco screen unit 78 was put into place, the Sweco screen was cleared of debris and the basket strainers were cleaned. Immediately after these procedures, the reclaim pump 142 was turned on and the pump pressure was adjusted to 10 psi. After the proper pressure of the reclaim pump was reached, the deluge pump 190 was turned on and the pressure adjusted to 10 psi. The circulating pump on the packed tower 50 was turned on and the pressure adjusted to 25 psi and, when the proper operating pressure was reached, the packed tower fan was activated. Immediately, the venturi scrubber 254 was switched on and the photohelic on the venturi was adjusted to slightly negative pressure (−0.05 inches of water) using the damper over the hydrolysis tank.

In order to ensure that no fumes from the process operation would escape into the work area, a positive pressure from the work area to the processing system was maintained. This pressure differential was checked at various air intake locations such as at the conveyor port in the hydrolysis room. A strip of tissue paper was used to note the direction of air flow. The direction of air flow at all points was into the process system indicating a positive pressure in the work area and thus assuring a safe operating environment. Then the hammermill 26 was turned on and was allowed to reach operating speed. A constant reading of 37 amps was measured by the Williams AC amp meter (model 3324) associated with the hammermill.

The material was processed in the following manner. Wearing a bomb-proof suit, the technician carefully opened a drum containing lithium batteries. The batteries were carefully loaded into the conveyor 30 and fed remotely into the hammermill 26. The feed rate was controlled by the production manager using a hand held, on-off switch. Feed rates were determined by observing the residency time and fume generation produced during the shredding process. The feed rates varied due to the complex nature, different size, and variety of the waste lithium cells and electrolyte material. A representative summary of the types of batteries and electrolyte treated, and some observations were made during two production days appear in Table I.

TABLE I

| PRODUCTION SUMMARY AND OBSERVATIONS OF PRODUCTION | | | | | |
|---|---|---|---|---|---|
| BATTERY TYPE | BATTERY SIZE | NUMBER OR WEIGHT IN CHARGE | MAXIMUM AMPS | RESIDENCY TIME | OBSERVATIONS |
| BCX | D | 2 Batt. | 40 | 15 Sec. | Mild explosion. Fumes contained in chute. |
| BCX | D | 3 Batt. | 40 | 20 Sec. | Mild explosion. Fumes contained in chute. |
| BCX | D | 4 Batt. | 42 | 30 Sec. | Violent explosion. Fumes escaped to hydrolysis room but not into work place. |

TABLE I-continued
PRODUCTION SUMMARY AND OBSERVATIONS OF PRODUCTION

| BATTERY TYPE | BATTERY SIZE | NUMBER OR WEIGHT IN CHARGE | MAXIMUM AMPS | RESIDENCY TIME | OBSERVATIONS |
|---|---|---|---|---|---|
| Pacemaker | | 6 lbs. | 40 | 30 Sec. | No explosions or smoke, small flame in pit. |
| CSC | AA | 11 Batt. | 38 | 30 Sec. | Popping noise. No fumes. |
| CSC | C | 9 Batt. | 38 | 30 Sec. | Popping, lithium sparks. No fumes. |
| CSC | D | 4 Batt. | 39 | 30 Sec. | Small explosions, some fumes in hydrolysis room. |
| Cell Pack | D | 14 Cells | 120 | 40 Sec. | Large explosion. Fumes entered hydrolysis room but did not enter work place. |
| BCX | D-C-AA Mix. | 5 lbs. | NO | 40 Sec. | Very strong explosion. Fumes contained in chute. |
| $SOCl_2$ | Electrolyte | 1 pint | NO | NO | Fumes in pit and packed tower only. |
| $SO_2Cl_2$ | Electrolyte | 1 pint | NO | NO | Fumes in pit and packed tower only. |

NO - Not Observed
BCX - Lithium/Thionyl Chloride cell mfg. by Electrochem Industries Inc.
CSC - Lithium/Sulfuryl Chloride cell mfg. by Electrochem Industries Inc.
Pacemaker - Lithium/Iodine mfg. by Wilson Greatbatch Ltd.

A typical feed rate for a four battery charge averaged between 15 and 30 seconds per charge. The greatest problems occurred with the lithium-thionyl chloride D cell size batteries due to the heavy fumes produced upon shredding and hydrolysis.

A general summary of the observations on the shredding-hydrolysis process is as follows. When the batteries were dropped into the hammermill chute 28, the hammers impacted the sealed batteries causing a strong release of energy. The reaction of the deluge water and exposed lithium caused the lithium to ignite and hydrogen gas to be formed. Depending on the nature of the electrolyte used in the battery, various corrosive fumes were produced by the hydrolysis process. In the case of the BCX batteries, for example, the thionyl chloride electrolyte reacted with water to produce hydrochloric acid and thionyl chloride mist which filled the hydrolysis room but did not enter the work area. The fumes were drawn from the room and the hydrolysis chamber through the scrubber system. Although heavy fumes were observed in the packed tower scrubber 50, no fumes were seen emanating from the outside stack 282.

After processing, the hammermill 26 was shut down. The recirculating pump 190 and deluge system were run for an additional five minutes to allow any unreacted material to hydrolyze completely. The scrubber fans 228, 270 and 276 were allowed to remain on for ten minutes after hammermill shut down to allow the hydrolysis room and scrubber system to be cleared of any remaining fumes. After the room was cleared of fumes, the packed tower and venturi scrubber fans were turned off.

The pH in the pit 36 and scrubber systems after processing approximately 350 pounds of various batteries and about 4 pints of electrolyte were measured as follows:
pH pit—7.9
pH of Packed Tower $H_2O > 14$ (2.37 normal NaOH)
pH venturi $H_2O$—8.88

The change in pH of the pit water resulted from the combined effects of lithium metal and electrolyte hydrolysis reactions; while the change in pH in the scrubber systems resulted primarily from the thionyl chloride mists hydrolyzing to sulfurous acid and hydrochloric acid thus neutralizing the alkaline salts present in the scrubber water.

The following equations represent neutralizing chemical reactions of some of the more important reactive components of lithium cells that occur in this process:

Pit $2Li + 2H_2O \rightarrow 2LiOH + H_2$
$SOCl_2 + 2H_2O \rightarrow H_2SO_3 + 2HCl$
$H_2SO_3 + 2NaOH \rightarrow Na_2SO_3 + 2H_2O$
$HCl + NaOH \rightarrow NaCl + H_2O$
$I_2 + Na_2SO_3 + 2NaOH \rightarrow 2NaI + Na_2SO_4 + H_2O$ Packed Tower $H_2O$ $SOCl_2 + 2H_2O \rightarrow H_2SO_3 + 2HCl$
$H_2SO_3 + 2NaOH \rightarrow Na_2SO_3 + 2H_2O$
$HCl + NaOH \rightarrow NaCl + H_2O$ Venturi $H_2O$ (Mildly Alkaline in NaOH)

Water Vapor and Acid Mist $\rightarrow NaCl + Na_2SO_3$
$HCl + H_2SO_3$

The hydrolysis water contained a mixture of plastics, stainless steel, carbon and inorganic salts such as sodium sulfite, sodium chloride, sodium hydroxide and lithium hydroxide. The reducing salt, sodium sulfite, was beneficial in that it reduced any corrosive free iodine ($I_2$) which was present in the system as a result of treating the lithium-iodine batteries. Innocuous battery components such as the plastics, carbon and stainless steel comprises most of the sludge found in the tank 36. The presence of hydroxides were important since they greatly reduced the volatility of cyanides and sulfides which may be present as discharge products of lithium batteries.

It is therefore apparent that the present invention accomplishes its intended objects. While an embodiment of the present invention has been described in detail, this has been done for purposes of illustration, not limitation.

We claim:

1. A method for treating high energy density lithium batteries in a manner permitting safe disposal thereof, each of said batteries comprising a casing having reactive material therein, comprising:
   (a) introducing said batteries to a hammermill to open the battery casings to allow access to the interiors thereof;
   (b) simultaneously deluging said hammermill with an alkaline neutralizing liquid to introduce said liquid to the interiors of said opened casings to neutralize the reactive material in said casings, the blades of said hammermill increasing the velocity of said liquid flowing therethrough;
   (c) collecting said liquid and opened casings exiting from said hammermill in a container holding a static quantity of said liquid;
   (d) removing gas evolved during opening of said casings and neutralizing of said reactive material and cleaning the gas by scrubbing to remove any particulate contaminants therein;
   (e) cooling the liquid in said container; and
   (f) filtering the liquid in the container to remove particulate matter larger than a predetermined size.

2. A method according to claim 1, wherein said step of cooling the liquid is performed by passing the liquid in heat exchange relationship with well water.

3. A method according to claim 1, wherein the gas is cleaned by scrubbing in a first stage to remove acid gases and then scrubbing in the second stage for demisting.

4. A method according to claim 1 wherein a portion of the filtered liquid from said container is returned to said hammermill.

* * * * *